W. S. FAIRHURST.
VALVE.
APPLICATION FILED NOV. 26, 1912.
1,073,338.
Patented Sept. 16, 1913.
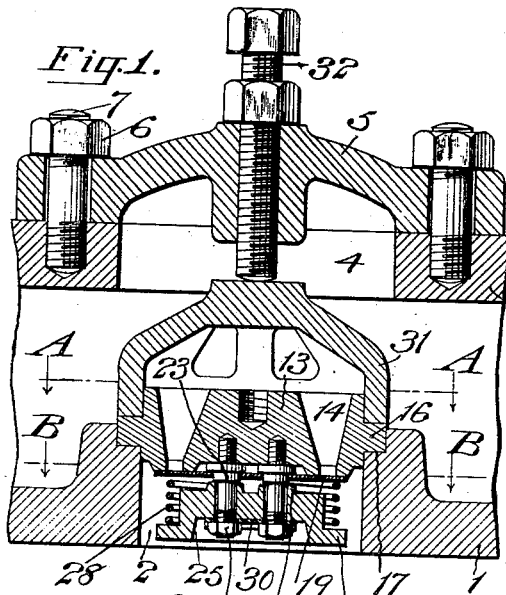
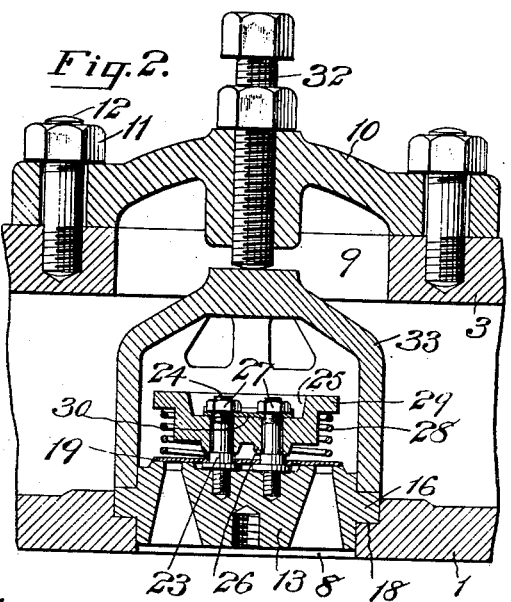
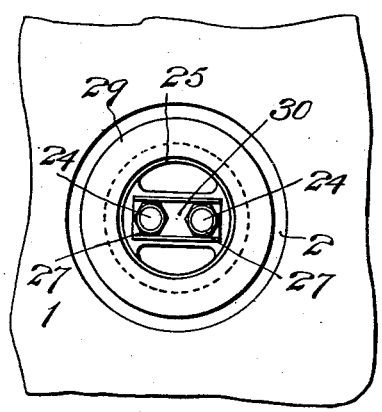
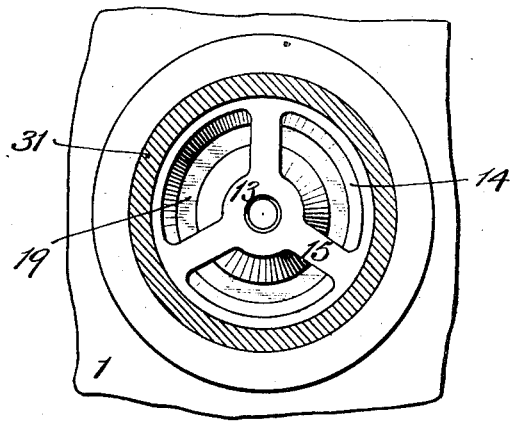
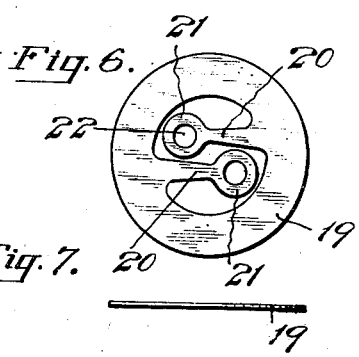
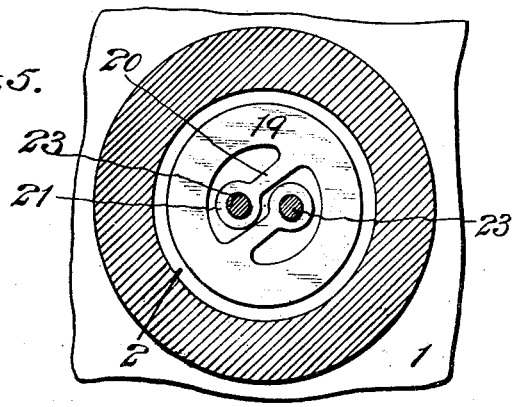
Witnesses:—
Hyperion Barry
F. George Barry
Inventor:—
William S. Fairhurst
by his attorneys
Brown & Seward

UNITED STATES PATENT OFFICE.

WILLIAM S. FAIRHURST, OF NEW YORK, N. Y.

VALVE.

1,073,338.

Specification of Letters Patent.

Patented Sept. 16, 1913.

Application filed November 26, 1912. Serial No. 733,693.

*To all whom it may concern:*

Be it known that I, WILLIAM S. FAIRHURST, a citizen of the United States, and resident of the borough of Brooklyn, in the city and State of New York, have invented a new and useful Improvement in Valves, of which the following is a specification.

The object of this invention is to provide certain improvements in the construction, form and arrangement of the several parts of a valve whereby its operation is facilitated and its structure simplified and it is capable of use either as a suction valve or as a discharge valve.

A practical embodiment of my invention is represented in the accompanying drawings, in which—

Figure 1 represents in section a portion of a fluid compressor with the valve applied thereto as a suction valve, Fig. 2 is a similar view with the valve applied as a discharge valve, Fig. 3 is an inner end view with the parts in the position shown in Fig. 1, Fig. 4 is a section taken in the plane of the line A—A of Fig. 1, Fig. 5 is a section taken in the plane of the line B—B of Fig. 1, Fig. 6 is a plan view of the valve proper, and Fig. 7 is a side view of the same.

In Fig. 1 the inner wall 1 of the cylinder is shown as provided with the usual outlet port 2 and the outer wall 3 as being provided with the usual hole 4 through which the valve may be inserted and removed. A removable cap covers the hole 4 and is removably secured to the outer wall 3, as, for instance, by nuts and bolts 6 and 7.

In Fig. 2 the inner wall 1 of the cylinder is provided with a discharge port 8 and the outer wall 3 is provided with a hole 9 for permitting the insertion and removal of the valve. A removable cap 10 covers the hole 9 and is secured to the outer wall 3 by suitable means, such, for instance, as nuts and bolts 11 and 12.

The valve seat 13 has a fluid passage 14 therethrough, the inner and outer portions of the said valve seat being connected by one or more ribs 15. This valve seat is provided with a peripheral flange 16 which rests in an annular recess 17 surrounding the outlet port 2 when the valve is used as a suction valve and in an annular recess 18 surrounding the discharge port 8 when the valve is used as a discharge valve.

The valve is formed of spring sheet metal, such as sheet steel, and comprises an annular portion 19 and one or more inwardly projecting spring arms 20. In the present instance I have shown two of these inwardly projecting arms 20, each provided with a head 21 having a hole 22 therethrough for the reception of the enlarged portion 23 of a guide pin 24, projecting from one face of the valve seat 13. These guide pins 24 are herein shown as bolts screwed into the valve seat and having screw threaded ends projecting through a guide plate 25. The guide plate 25 is provided on its face adjacent to the face of the valve seat with lugs 26 surrounding the bolts 24. Nuts 27 engaging the bolts 24 serve to hold the guide plate 25 with its lugs 26 rigidly against the enlargements 23 on the bolts 24, on which enlargements the valve proper has a limited bodily movement toward and away from its seat.

A coil spring 28 is interposed between the annular portion 19 of the valve proper and a peripheral flange 29 on the guide plate 25, which spring serves to hold the valve normally closed. The spring arms 20 of the valve proper permit the valve to be self-yielding after the valve has reached the limit of its bodily movement away from the valve seat. A common lock washer 30 may be interposed between the nuts 27 and the adjacent face of the guide plate 25.

When the valve is used as a suction valve, a valve cage 31, such as that shown in Fig. 1, is provided, which valve cage engages the flange 16 of the valve seat. A bolt 32 extends through the cap 5 into engagement with the cage 31 and serves to hold the valve seat rigidly in position.

When the valve is reversed for use as a discharge valve, as shown in Fig. 2, a slightly modified form of valve cage 33 is interposed between the flange 16 of the valve seat and the bolt 32 which extends through the cover 10.

It is intended to make the valve proper of spring sheet steel, thus insuring a long life therefor.

It will be seen that the valve proper has a bodily movement toward and away from its seat and that it also has a self-yielding movement thus permitting a very wide opening of the valve with a relatively short movement of the valve on its guide. It will also be seen that a valve constructed substantially in accordance with the disclosure herein, will be suitable for use either as a suction valve or a discharge valve by a mere reversal of the same.

While I have shown this valve in connection with the cylinder of a fluid compressor, it is to be understood that the valve may be used wherever applicable.

What I claim is:—

1. A sheet metal valve comprising an annular portion provided with two inwardly and oppositely projecting arms each leading from one side of the annular portion to a point adjacent to the other side thereof, the heads of said arms having holes for the reception of guide pins.

2. A valve comprising a valve seat, a valve guide plate, pins connecting the plate with the seat, and a valve proper comprising an annular portion provided with two inwardly and oppositely projecting arms, each leading from one side of the annular portion to a point adjacent to the other side thereof, said arms having holes in their free ends engaging said pins.

3. A valve comprising a valve seat, a valve guide plate, pins connecting the plate with the seat and a valve proper comprising an annular portion provided with two inwardly and oppositely projecting arms, each leading from one side of the annular portion to a point adjacent to the other side thereof, said arms having holes in their free ends engaging said pins, said valve proper having a limited bodily movement on said pins and a self-yielding movement.

4. A valve comprising a reversible valve seat provided with a peripheral flange intermediate its top and bottom faces, a valve guide plate, pins connecting the plate with the seat and a valve proper having a limited bodily movement and a self-yielding movement between the valve seat and valve guide plate, said valve proper comprising an annular portion provided with two inwardly and oppositely projecting arms, each arm leading from one side of the annular portion to a point adjacent to the other side thereof, said arms having holes in their free ends engaging said pins.

In testimony, that I claim the foregoing as my invention, I have signed my name in presence of two witnesses, this twenty-first day of November 1912.

WILLIAM S. FAIRHURST.

Witnesses:
F. George Barry,
C. S. Sundgren.